United States Patent
Uchida et al.

(10) Patent No.: US 10,317,654 B2
(45) Date of Patent: Jun. 11, 2019

(54) VARIABLE MAGNIFICATION OPTICAL SYSTEM, OPTICAL APPARATUS, AND VARIABLE MAGNIFICATION OPTICAL SYSTEM MANUFACTURING METHOD

(71) Applicant: Nikon Corporation, Minato-ku, Tokyo (JP)

(72) Inventors: Kensuke Uchida, Fujisawa (JP); Akihiko Obama, Tokyo (JP); Norikazu Yokoi, Yokohama (JP); Hiroshi Yamamoto, Kawasaki (JP); Taku Matsuo, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/539,033

(22) PCT Filed: Dec. 25, 2015

(86) PCT No.: PCT/JP2015/086342
§ 371 (c)(1),
(2) Date: Oct. 30, 2017

(87) PCT Pub. No.: WO2016/104747
PCT Pub. Date: Jun. 30, 2016

(65) Prior Publication Data
US 2018/0217363 A1  Aug. 2, 2018

(30) Foreign Application Priority Data

Dec. 26, 2014 (JP) ................................ 2014-266035

(51) Int. Cl.
*G02B 15/14* (2006.01)
*G02B 15/20* (2006.01)
(Continued)

(52) U.S. Cl.
CPC ............. *G02B 15/20* (2013.01); *G02B 13/02* (2013.01); *G02B 15/14* (2013.01); *G02B 15/22* (2013.01);
(Continued)

(58) Field of Classification Search
CPC ........ G02B 15/00; G02B 15/14; G02B 15/15; G02B 15/16; G02B 15/163; G02B 15/167;
(Continued)

(56) References Cited

U.S. PATENT DOCUMENTS 4,662,724 A * 5/1987 Moriyama ........... G02B 15/173
359/687
4,789,226 A  12/1988 Ogata
(Continued)

FOREIGN PATENT DOCUMENTS

CN  101183172 A  5/2008
CN  102087403 A  6/2011
(Continued)

OTHER PUBLICATIONS

Office Action dated May 22, 2018 in Japanese Patent Application No. 2016-566541.
(Continued)

*Primary Examiner* — Thong Q Nguyen
(74) *Attorney, Agent, or Firm* — Shapiro, Gabor and Rosenberger, PLLC

(57) ABSTRACT

A variable magnification optical system includes: a first lens group having positive refractive power and arranged closest to an object; a negative lens group having negative refractive power; a positive lens group which has positive refractive power, which includes at least one lens that moves integrally with an aperture stop, and which is arranged closer to an image than the negative lens group; and a focusing group
(Continued)

arranged between the negative lens group and the positive lens group. When varying magnification, distances between the first lens group and the negative lens group and between the negative lens group and the positive lens group are changed. When focusing, distances between the focusing group and a lens facing an object-side of the focusing group and between the focusing group and a lens facing an image-side of the focusing group are changed. A predetermined conditional expression is satisfied.

19 Claims, 10 Drawing Sheets

(51) Int. Cl.
    *G02B 15/22*     (2006.01)
    *G02B 13/02*     (2006.01)
    *G03B 5/02*     (2006.01)

(52) U.S. Cl.
    CPC ........ *G03B 5/02* (2013.01); *G03B 2205/0046* (2013.01)

(58) Field of Classification Search
    CPC ...... G02B 15/173; G02B 15/20; G02B 15/22; G02B 15/24; G02B 15/28
    See application file for complete search history.

(56) References Cited

U.S. PATENT DOCUMENTS

| | | | | |
|---|---|---|---|---|
| 5,272,564 | A * | 12/1993 | Suzuki | G02B 15/173 |
| | | | | 359/676 |
| 5,579,171 | A | 11/1996 | Suzuki et al. | |
| 5,930,051 | A | 7/1999 | Sato | |
| 6,124,972 | A | 9/2000 | Hayakawa et al. | |
| 2001/0030809 | A1 | 10/2001 | Hayakawa et al. | |
| 2007/0188888 | A1* | 8/2007 | Saori | G02B 15/173 |
| | | | | 359/692 |
| 2007/0217024 | A1 | 9/2007 | Kamo et al. | |
| 2008/0112061 | A1 | 5/2008 | Miyajima | |
| 2009/0086321 | A1* | 4/2009 | Mizuguchi | G02B 15/173 |
| | | | | 359/557 |
| 2009/0103187 | A1 | 4/2009 | Watanebe et al. | |
| 2011/0102908 | A1* | 5/2011 | Murayama | G02B 13/18 |
| | | | | 359/687 |
| 2011/0122508 | A1 | 5/2011 | Miwa et al. | |
| 2011/0261469 | A1 | 10/2011 | Arai | |
| 2012/0063003 | A1* | 3/2012 | Li | G02B 15/173 |
| | | | | 359/687 |
| 2014/0320976 | A1 | 10/2014 | Nakahara | |

FOREIGN PATENT DOCUMENTS

| | | |
|---|---|---|
| CN | 102132189 A | 7/2011 |
| CN | 102236157 A | 11/2011 |
| CN | 104122660 A | 10/2014 |
| CN | 104204896 A | 12/2014 |
| EP | 2 383 598 A2 | 11/2011 |
| EP | 2796914 A2 | 10/2014 |
| JP | 60-026312 A | 2/1985 |
| JP | 04-096012 A | 3/1992 |
| JP | 06-289298 A | 10/1994 |
| JP | 08-136862 A | 5/1996 |
| JP | 10-197794 A | 7/1998 |
| JP | 2007-240747 A | 9/2007 |
| JP | 2008-146016 A | 6/2008 |
| JP | 2009-075581 A | 4/2009 |
| JP | 2009-169082 A | 7/2009 |
| JP | 2010-145759 A | 7/2010 |
| JP | 2010-217838 A | 9/2010 |
| JP | 2011-112832 A | 6/2011 |
| JP | 2011-232502 A | 11/2011 |
| JP | 2012-093548 A | 5/2012 |

OTHER PUBLICATIONS

International Search Report from International Patent Application No. PCT/JP2015/086342, dated Mar. 15, 2016.

Written Opinion of the International Searching Authority from International Patent Application No. PCT/JP2015/086342, dated Mar. 15, 2016.

Office Action dated Dec. 11, 2018, in Japanese Patent Application No. 2016-566541.

Office Action dated Dec. 25, 2018 in Chinese Patent Application No. 201580074891.8.

* cited by examiner

FIG. 2
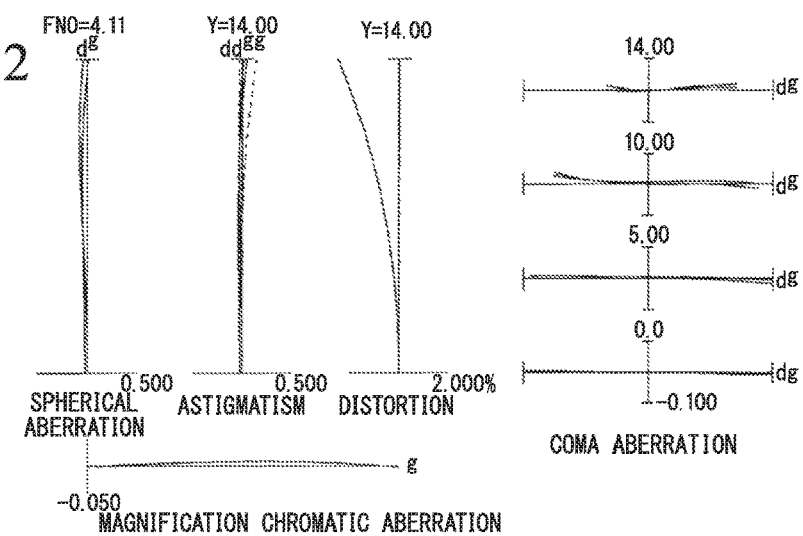
(a)
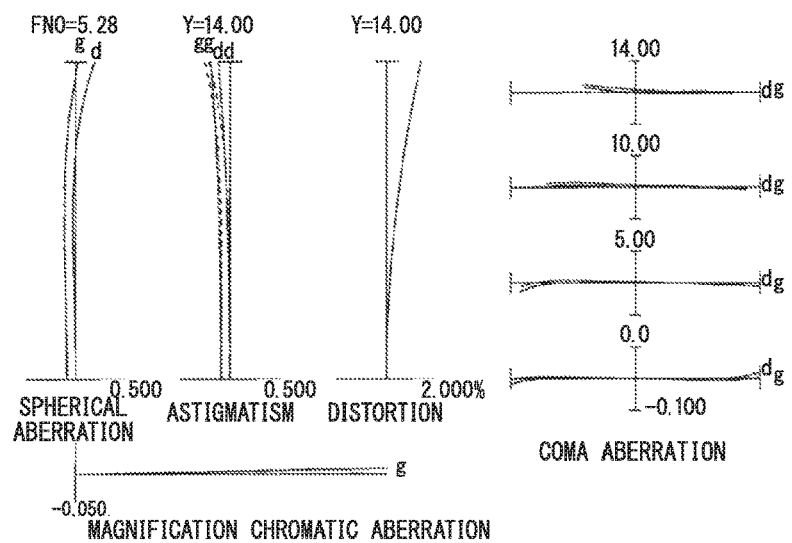
(b)
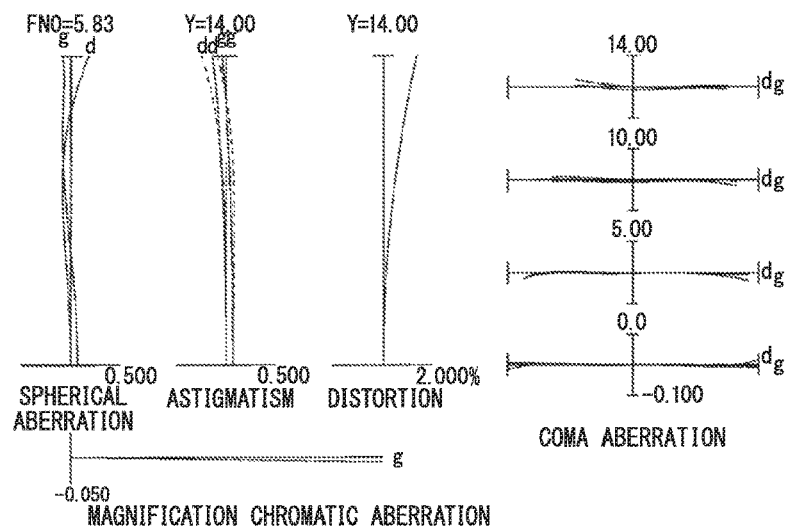
(c)

US 10,317,654 B2

VARIABLE MAGNIFICATION OPTICAL SYSTEM, OPTICAL APPARATUS, AND VARIABLE MAGNIFICATION OPTICAL SYSTEM MANUFACTURING METHOD

TECHNICAL FIELD

The present invention relates to a variable magnification optical system, an optical apparatus, and a variable magnification optical system manufacturing method.

Priority is claimed on Japanese Patent Application No. 2014-266035, filed on Dec. 26, 2014, the contents of which are incorporated herein by reference.

TECHNICAL BACKGROUND

In the related art, variable magnification optical systems which are suitable for photographic cameras, electronic still cameras, video cameras, and the like have been proposed (for example, refer to Patent Document 1).

RELATED ART DOCUMENTS

Patent Document

Patent Document 1: Japanese Patent Application, Publication No. 2010-217838

SUMMARY OF INVENTION

Technical Problem

However, in the variable magnification optical systems in the related art, aberration variation is large when varying magnification, and it is difficult to ensure a satisfactory optical performance.

Solution to Problem

A variable magnification optical system according to an aspect of the present invention includes: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, wherein when varying magnification, a distance between the first lens group and the negative lens group is changed, and a distance between the negative lens group and the positive lens group is changed, wherein when focusing, a distance between the focusing group and a lens arranged at a position to face an object-side of the focusing group is changed, and a distance between the focusing group and a lens arranged at a position to face an image-side of the focusing group is changed, and wherein the following conditional expression is satisfied:

$$2.00 < fp/(-fn) < 5.50$$

$$1.83 < fp/ff < 4.75$$

where
fp: a focal length of the positive lens group,
fn: a focal length of the negative lens group, and
ff: a focal length of the focusing group.

Another aspect of the present invention is a variable magnification optical system including: in order from an object along an optical axis, a first lens group having a positive refractive power; a second lens group having a negative refractive power; a third lens group having a positive refractive power; and a fourth lens group having a positive refractive power, wherein when varying magnification, a distance between the first lens group and the second lens group is changed, a distance between the second lens group and the third lens group is changed, and a distance between the third lens group and the fourth lens group is changed, wherein when focusing, at least part of the third lens group as a focusing group moves along the optical axis, and wherein the following conditional expression is satisfied:

$$2.00 < fp/(-fn) < 5.50$$

$$1.83 < fp/ff < 4.75$$

where
fn: a focal length of the second lens group,
ff: a focal length of the third lens group, and
fp: a focal length of the fourth lens group.

An optical apparatus according to another aspect of the present invention includes the variable magnification optical system.

A variable magnification optical system manufacturing method according to another aspect of the present invention is a manufacturing method of a variable magnification optical system including: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, the method including: arranging, when varying magnification, such that a distance between the first lens group and the negative lens group is changed, and a distance between the negative lens group and the positive lens group is changed; and arranging, when focusing, such that a distance between the focusing group and a lens arranged at a position to face an object-side of the focusing group is changed, and a distance between the focusing group and a lens arranged at a position to face an image-side of the focusing group is changed, wherein the following conditional expression is satisfied:

$$2.00 < fp/(-fn) < 5.50$$

$$1.83 < fp/ff < 4.75$$

where
fp: a focal length of the positive lens group,
fn: a focal length of the negative lens group, and
ff: a focal length of the focusing group.

Another aspect of the present invention is a variable magnification optical system manufacturing method that is a manufacturing method of a variable magnification optical system including: in order from an object along an optical axis, a first lens group having a positive refractive power; a second lens group having a negative refractive power; a third lens group having a positive refractive power; and a fourth lens group having a positive refractive power, the method including: arranging, when varying magnification, such that a distance between the first lens group and the second lens group is changed, a distance between the second lens group and the third lens group is changed, and a distance between the third lens group and the fourth lens group is changed; and arranging such that at least part of the third lens group moves as a focusing group along the optical axis when focusing, wherein the following conditional expression is satisfied:

$$2.00 < fp/(-fn) < 5.50$$

$$1.83 < fp/ff < 4.75$$

where
fn: a focal length of the second lens group,
ff: a focal length of the third lens group, and
fp: a focal length of the fourth lens group.

BRIEF DESCRIPTION OF THE DRAWINGS

FIG. 2 shows graphs showing various aberrations of the variable magnification optical system according to Example 1 in an infinity focusing state, wherein part (a) shows various aberrations in the wide-angle end state, part (b) shows various aberrations in the intermediate focal length state, and part (c) shows various aberrations in the telephoto end state.

DESCRIPTION OF EMBODIMENTS

Figure 1:
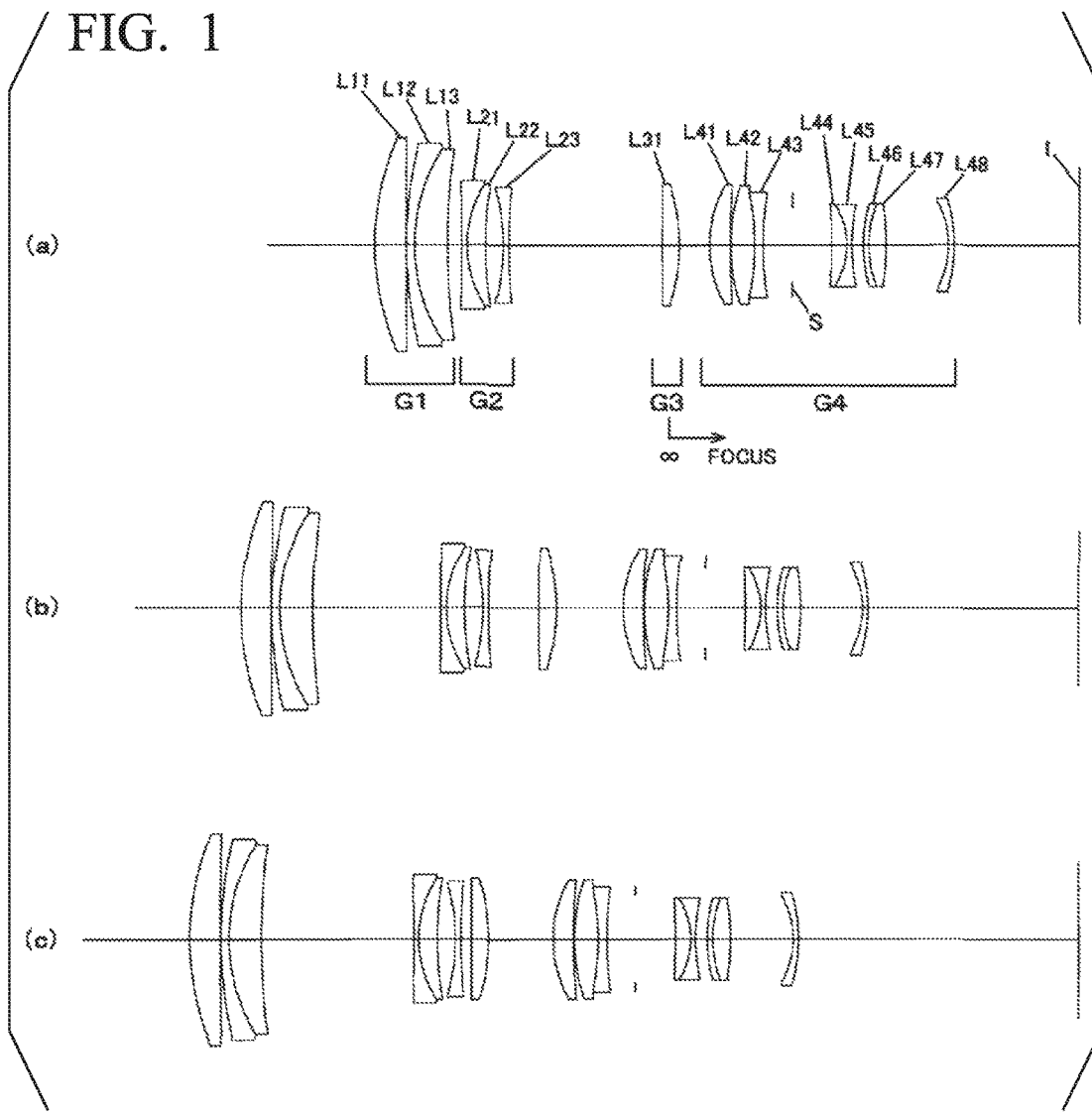
FIG. 1 is a cross-sectional view showing a lens configuration of a variable magnification optical system according to Example 1. Part (a) shows a wide-angle end state, part (b) shows an intermediate focal length state, and part (c) shows a telephoto end state.

Hereinafter, a variable magnification optical system, an optical apparatus, and a variable magnification optical system manufacturing method are described.

In an embodiment, a variable magnification optical system includes: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, wherein when varying magnification, the distance between the first lens group and the negative lens group is changed, and the distance between the negative lens group and the positive lens group is changed. According to such a configuration, while realizing varying magnification from a wide-angle end state to a telephoto end state, it is possible to prevent spherical aberration variation and astigmatism variation associated with varying magnification and to realize a satisfactory optical performance even when varying magnification. Further, when focusing, the distance between the focusing group and a lens arranged at a position to face an object-side of the focusing group is changed, and the distance between the focusing group and a lens arranged at a position to face an image-side of the focusing group is changed. According to such a configuration, it is possible to reduce the height from an optical axis of an off-axis light flux in the focusing group, and therefore, it is possible to downsize the focusing group. Further, it is possible to prevent astigmatism variation when focusing and to realize a satisfactory optical performance.

In an alternative embodiment, a variable magnification optical system includes: in order from an object along an optical axis, a first lens group having a positive refractive power; a second lens group having a negative refractive power; a third lens group having a positive refractive power; and a fourth lens group having a positive refractive power, wherein when varying magnification, the distance between the first lens group and the second lens group is changed, the distance between the second lens group and the third lens group is changed, and the distance between the third lens group and the fourth lens group is changed. According to such a configuration, while realizing varying magnification from a wide-angle end state to a telephoto end state, it is possible to prevent spherical aberration variation and astigmatism variation associated with varying magnification and to realize a satisfactory optical performance even when varying magnification.

Further, in the alternative embodiment, in the variable magnification optical system, at least part of the third lens group as the focusing group (focusing lens group) can preferably move along the optical axis when focusing.

According to such a configuration, it is possible to reduce the height from an optical axis of an off-axis light flux in the focusing group, and therefore, it is possible to downsize the focusing group. Further, it is possible to prevent astigmatism variation when focusing and to realize a satisfactory optical performance.

In the embodiments, the variable magnification optical system can preferably satisfy Conditional Expression (1) below.

$$2.00 < fp/(-fn) < 5.50 \quad (1)$$

where fn: a focal length of the negative lens group (second lens group), and fp: a focal length of the positive lens group (fourth lens group).

Conditional Expression (1) is a conditional expression for defining an appropriate ratio of the focal length of the positive lens group (fourth lens group) to the focal length of the negative lens group (second lens group). When Conditional Expression (1) is satisfied, it is possible to prevent spherical aberration variation, coma aberration variation, and astigmatism variation when varying magnification and astigmatism variation when focusing.

When the focal length ratio exceeds the upper limit of Conditional Expression (1), the refractive power of the negative lens group (second lens group) becomes strong, and it becomes difficult to prevent spherical aberration variation when varying magnification and astigmatism variation when focusing. In order to reliably obtain the effect, the upper limit value of Conditional Expression (1) can be preferably 5.46. In order to further reliably obtain the effect, the upper limit value of Conditional Expression (1) can be further preferably 5.43.

On the other hand, when the focal length ratio is smaller than the lower limit of Conditional Expression (1), the refractive power of the negative lens group (second lens group) becomes weak, and therefore, in order to ensure a desired variable magnification ratio, it is necessary to increase a distance change between the first lens group and the negative lens group (second lens group) or a distance change between the negative lens group (second lens group) and the focusing group (third lens group) when varying magnification. As a result, the variation of the height from the optical axis of the off-axis light flux that passes through the first lens group and the negative lens group (second lens group) when varying magnification becomes too large, and therefore, it becomes difficult to prevent variation of coma aberration or astigmatism when varying magnification. In order to reliably obtain the effect, the lower limit value of Conditional Expression (1) can be preferably 2.49. In order to further reliably obtain the effect, the lower limit value of Conditional Expression (1) can be further preferably 2.97.

In the embodiments, the variable magnification optical system can preferably satisfy Conditional Expression (2) below.

$$1.83 < fp/ff < 4.75 \quad (2)$$

where ff: a focal length of the focusing group (third lens group).

Conditional Expression (2) is a conditional expression for defining an appropriate ratio of the focal length of the positive lens group (fourth lens group) to the focal length of the focusing group (third lens group). When Conditional Expression (2) is satisfied, it is possible to prevent astigmatism variation when varying magnification and spherical aberration variation, on-axis chromatic aberration variation, and astigmatism when focusing.

When the focal length ratio exceeds the upper limit of Conditional Expression (2), the refractive power of the focusing group (third lens group) becomes strong, and astigmatism variation when varying magnification and spherical aberration variation and on-axis chromatic aberration variation when focusing becomes large, and it becomes difficult to realize a satisfactory optical performance. In order to reliably obtain the effect, the upper limit value of Conditional Expression (2) can be preferably 4.14. In order to further reliably obtain the effect, the upper limit value of Conditional Expression (2) can be further preferably 3.53.

On the other hand, when the focal length ratio is smaller than the lower limit of Conditional Expression (2), since the refractive power of the focusing group (third lens group) becomes weak, and the movement amount of the focusing group (third lens group) when focusing becomes large, it becomes difficult to downsize a drive mechanism of the focusing group (third lens group), and furthermore, it becomes difficult to prevent astigmatism variation when focusing. In order to reliably obtain the effect, the lower limit value of Conditional Expression (2) can be preferably 1.85. In order to further reliably obtain the effect, the lower limit value of Conditional Expression (2) can be further preferably 1.86.

According to the above configuration, the variable magnification optical system can prevent aberration variation when varying magnification and ensure a satisfactory optical performance. Further, according to the above configuration, it is possible to downsize the focusing group (focusing lens group), and it is possible to realize downsizing of the focusing mechanism and speeding up of a focusing speed.

In the embodiments, it can be preferable that, when varying magnification, the first lens group move with respect to an image plane in the variable magnification optical system. According to such a configuration, it is possible to prevent spherical aberration variation and astigmatism variation when varying magnification and to realize a satisfactory optical performance.

In the embodiments, the variable magnification optical system can preferably satisfy Conditional Expression (3) below.

$$2.50 < f1/(-fn) < 5.00 \quad (3)$$

where f1: a focal length of the first lens group.

Conditional Expression (3) is a conditional expression for defining an appropriate ratio of the focal length of the first lens group to the focal length of the negative lens group (second lens group). When Conditional Expression (3) is satisfied, it is possible to prevent spherical aberration variation, astigmatism variation, and on-axis chromatic aberration variation when varying magnification and astigmatism variation when focusing.

When the focal length ratio exceeds the upper limit of Conditional Expression (3), the refractive power of the negative lens group (second lens group) becomes strong, and it becomes difficult to prevent spherical aberration variation and astigmatism variation when varying magnification and astigmatism variation when focusing in the wide-angle end state. In order to reliably obtain the effect, the upper limit value of Conditional Expression (3) can be preferably 4.77. In order to further reliably obtain the effect, the upper limit value of Conditional Expression (3) can be further preferably 4.54.

On the other hand, when the focal length ratio is smaller than the lower limit of Conditional Expression (3), the refractive power of the first lens group becomes strong, and it becomes difficult to prevent spherical aberration variation and on-axis chromatic aberration variation when varying magnification. In order to reliably obtain the effect, the lower limit value of Conditional Expression (3) can be preferably 2.73. In order to further reliably obtain the effect, the lower limit value of Conditional Expression (3) can be further preferably 2.95.

In the embodiments, the variable magnification optical system can preferably satisfy Conditional Expression (4) below.

$$1.50 < f1/fw < 2.60 \quad (4)$$

where fw: a focal length of the entire system in a wide-angle end state.

Conditional Expression (4) is a conditional expression for defining an appropriate range of the focal length of the first lens group. When Conditional Expression (4) is satisfied, it is possible to prevent spherical aberration variation and astigmatism variation when varying magnification.

When the focal length ratio exceeds the upper limit of Conditional Expression (4), the refractive power of the first lens group becomes weak, and in order to ensure a predetermined variable magnification ratio, it is necessary to increase a distance change between the first lens group and the negative lens group (second lens group) when varying magnification from a wide-angle end state to a telephoto end state. As a result, the entire optical length to an image plane from a lens closest to an object in the telephoto end state becomes long, and furthermore, it becomes difficult to prevent variation of astigmatism that arises at the first lens group when varying magnification. In order to reliably obtain the effect, the upper limit value of Conditional Expression (4) can be preferably 2.43. In order to further reliably obtain the effect, the upper limit value of Conditional Expression (4) can be further preferably 2.27.

On the other hand, when the focal length ratio is smaller than the lower limit of Conditional Expression (4), the refractive power of the first lens group becomes strong, and it becomes difficult to correct spherical aberration variation when varying magnification and on-axis chromatic aberration in the telephoto end state. In order to reliably obtain the effect, the lower limit value of Conditional Expression (4) can be preferably 1.58. In order to further reliably obtain the effect, the lower limit value of Conditional Expression (4) can be further preferably 1.66.

In the embodiments, the variable magnification optical system can preferably satisfy Conditional Expression (5) below when a focal length of the variable magnification optical system in the wide-angle end state is fw.

$$1.60 < fp/fw < 3.70 \quad (5)$$

Conditional Expression (5) is a conditional expression for defining an appropriate range of the focal length of the positive lens group (fourth lens group). When Conditional Expression (5) is satisfied, it is possible to prevent spherical aberration variation and astigmatism variation when varying magnification.

When the focal length ratio exceeds the upper limit of Conditional Expression (5), the refractive power of the positive lens group (fourth lens group) becomes weak, and since the entire optical length to an image plane from a lens closest to an object from the wide-angle end state to the telephoto end state becomes long, and furthermore, the movement amount of the positive lens group (fourth lens group) with respect to an image plane becomes large when varying magnification from the wide-angle end state to the telephoto end state, it becomes difficult to prevent astigmatism variation when varying magnification. In order to reliably obtain the effect, the upper limit value of Conditional Expression (5) can be preferably 3.40. In order to further reliably obtain the effect, the upper limit value of Conditional Expression (5) can be further preferably 3.10.

On the other hand, when the focal length ratio is smaller than the lower limit of Conditional Expression (5), the refractive power of the positive lens group (fourth lens group) becomes strong, and spherical aberration variation when varying magnification becomes large. In order to reliably obtain the effect, the lower limit value of Conditional Expression (5) can be preferably 1.76. In order to further reliably obtain the effect, the lower limit value of Conditional Expression (5) can be further preferably 1.92.

In the embodiments, the variable magnification optical system can preferably satisfy Conditional Expression (6) below.

$$0.12 < (-fn)/ft < 0.35 \quad (6)$$

where ft: a focal length of the entire system in a telephoto end state.

Conditional Expression (6) is a conditional expression for defining an appropriate range of the focal length of the negative lens group (second lens group). When Conditional Expression (6) is satisfied, it is possible to prevent coma aberration variation and astigmatism variation when varying magnification and astigmatism variation when focusing.

When the focal length ratio exceeds the upper limit of Conditional Expression (6), the refractive power of the negative lens group (second lens group) becomes weak, and therefore, in order to ensure a desired variable magnification ratio, it is necessary to increase a distance change between the first lens group and the negative lens group (second lens group) or a distance change between the negative lens group (second lens group) and the focusing group (third lens group) when varying magnification. As a result, the variation of the height from the optical axis of the off-axis light flux that passes through the first lens group and the negative lens group (second lens group) when varying magnification becomes too large, and therefore, it becomes difficult to prevent variation of coma aberration or astigmatism when varying magnification. In order to reliably obtain the effect, the upper limit value of Conditional Expression (6) can be preferably 0.30. In order to further reliably obtain the effect, the upper limit value of Conditional Expression (6) can be further preferably 0.26.

When the focal length ratio is smaller than the lower limit of Conditional Expression (6), the refractive power of the negative lens group (second lens group) becomes strong, and it becomes difficult to correct astigmatism variation when focusing in the wide-angle end state. In order to reliably obtain the effect, the lower limit value of Conditional Expression (6) can be preferably 0.13. In order to further reliably obtain the effect, the lower limit value of Conditional Expression (6) can be further preferably 0.14.

In the embodiments, in the variable magnification optical system, the focusing group (third lens group) can be preferably constituted by a single lens component. According to this configuration, it is possible to prevent optical performance degradation due to eccentric coma aberration and the like arising from a manufacturing error of the focusing group (focusing lens group). Further, it is possible to downsize the focusing group (focusing lens group). The "lens component" refers to a single lens or a cemented lens including a plurality of lenses that are affixed.

In the embodiments, it can be preferable that a variable magnification optical system include: in order from an object along an optical axis, a first lens group having a positive refractive power; a second lens group having a negative refractive power; and an aperture stop, wherein when varying magnification, the distance between the first lens group and the second lens group is changed, and wherein the aperture stop is arranged closer to an image plane than the second lens group. According to such a configuration, it is possible to make the size of the aperture stop small, and it is possible to realize a compact variable magnification optical system. The aperture stop can be preferably arranged closer to the image plane than the focusing group (third lens group). The aperture stop can be further preferably arranged in the positive lens group (fourth lens group).

In the embodiments, it can be preferable that a variable magnification optical system include: in order from an object along an optical axis, a first lens group having a positive refractive power; a second lens group having a negative refractive power; and a third lens group having a positive refractive power, wherein when varying magnification from the wide-angle end state to the telephoto end state, the distance between the first lens group and the second lens group is enlarged, and the distance between the second lens group and the third lens group is narrowed. According to such a configuration, while realizing varying magnification from the wide-angle end state to the telephoto end state, it is possible to prevent spherical aberration variation and astigmatism variation associated with varying magnification and to realize a satisfactory optical performance even when varying magnification.

The above configurations can be arbitrarily combined, and thereby, it is possible to realize a variable magnification optical system having a satisfactory optical performance.

In one embodiment, an optical apparatus includes a variable magnification optical system having the configuration described above. Thereby, it is possible to realize an optical apparatus having a satisfactory optical performance even when varying magnification and even when focusing. Further, it is possible to realize downsizing of the optical apparatus.

In one embodiment, a variable magnification optical system manufacturing method is a manufacturing method of a variable magnification optical system including: a first lens group having a positive refractive power and arranged closest to an object; a negative lens group having a negative refractive power and arranged closer to an image than the first lens group; a positive lens group which has a positive refractive power, which includes at least one lens that moves integrally with an aperture stop, and which is arranged closer to the image than the negative lens group; and a focusing group arranged between the negative lens group and the positive lens group, the method including: arranging, when varying magnification, such that the distance between the first lens group and the negative lens group is changed, and the distance between the negative lens group and the positive lens group is changed; and arranging, when focusing, such that the distance between the focusing group and a lens arranged at a position to face an object-side of the focusing group is changed, and the distance between the focusing group and a lens arranged at a position to face an image-side of the focusing group is changed, wherein Conditional Expressions (1) and (2) below are satisfied.

$$2.00 < fp/(-fn) < 5.50 \quad (1)$$

$$1.83 < fp/ff < 4.75 \quad (2)$$

where
fp: a focal length of the positive lens group,
fn: a focal length of the negative lens group, and
ff: a focal length of the focusing group.

In an alternative embodiment, a variable magnification optical system manufacturing method is a manufacturing method of a variable magnification optical system including: in order from an object along an optical axis, a first lens group having a positive refractive power; a second lens group having a negative refractive power; a third lens group having a positive refractive power; and a fourth lens group having a positive refractive power, the method including: arranging, when varying magnification, such that the distance between the first lens group and the second lens group is changed, the distance between the second lens group and the third lens group is changed, and the distance between the third lens group and the fourth lens group is changed; and arranging, when focusing, such that at least part of the third lens group as a focusing group moves along the optical axis, wherein Conditional Expressions (1) and (2) below are satisfied.

$$2.00 < fp/(-fn) < 5.50 \quad (1)$$

$$1.83 < fp/ff < 4.75 \quad (2)$$

where
fn: a focal length of the second lens group,
ff: a focal length of the third lens group, and
fp: a focal length of the fourth lens group.

According to these manufacturing methods, it is possible to manufacture a variable magnification optical system that prevents aberration variation when varying magnification and that ensures a satisfactory optical performance.

Hereinafter, a variable magnification optical system according to numerical examples is described with reference to the accompanied drawings.

Example 1

FIG. 1 is a cross-sectional view showing a configuration of a variable magnification optical system according to Example 1. Part (a) shows a wide-angle end state, part (b) shows an intermediate focal length state, and part (c) shows a telephoto end state. The variable magnification optical system according to Example 1 is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

Varying magnification from the wide-angle end state to the telephoto end state is performed by moving each lens group from the first lens group G1 to the fourth lens group G4 such that the air distance between the first lens group G1 and the second lens group G2 is enlarged, the air distance between the second lens group G2 and the third lens group G3 is narrowed, and the air distance between the third lens group G3 and the fourth lens group G4 is enlarged. At this time, the first lens group G1, the third lens group G3, and the fourth lens group G4 are moved toward an object, and the second lens group G2 is moved once toward an image plane I and is then moved toward the object.

The first lens group G1 is constituted by a cemented lens including, in order from the object along the optical axis, a positive meniscus lens L11 having a convex surface oriented toward the object, a negative meniscus lens L12 having a convex surface oriented toward the object, and a positive meniscus lens L13 having a convex surface oriented toward the object.

The second lens group G2 is constituted by, in order from the object along the optical axis, a cemented lens that includes a negative lens L21 having a biconcave shape and a positive meniscus lens L22 having a convex surface oriented toward the object and a negative lens L23 having a biconcave shape.

The third lens group G3 is constituted by a positive lens L31 having a biconvex shape.

The fourth lens group G4 is constituted by, in order from the object along the optical axis, a positive meniscus lens L41 having a convex surface oriented toward the object, a cemented lens that includes a positive lens L42 having a biconvex shape and a negative lens L43 having a biconcave shape, an aperture stop S, a cemented lens that includes a positive meniscus lens L44 having a concave surface oriented toward the object and a negative lens L45 having a biconcave shape, a cemented lens that includes a negative meniscus lens L46 having a convex surface oriented toward the object and a positive lens L47 having a biconvex shape, and a negative meniscus lens L48 having a concave surface oriented toward the object.

Focusing from an object at infinity to an object at a close distance is performed by moving the third lens group G3 toward the image plane I.

Table 1 below shows values of specifications of the variable magnification optical system according to Example 1.

In [Surface Data], a "surface number" indicates a sequence number of a lens surface counted from the object side along the optical axis, "r" indicates the radius of curvature, "d" indicates the distance (distance between an n-th surface (n is an integer) and an (n+1)-th surface), "nd" indicates the refractive index for the d-line (wavelength: λ=587.6 nm), and "vd" indicates the Abbe number for the d-line (wavelength: λ=587.6 nm). Moreover, an "object plane" indicates the object plane, "variable" indicates a variable distance between surfaces, an "aperture stop" indicates the aperture stop S, "Bf" indicates the back focus, and an "image plane" indicates the image plane I. In the radius of curvature "r", "∞" indicates a flat surface, and the refractive index nd=1.000000 of air is not shown.

In [Various Data], "W" indicates the wide-angle end, "M" indicates the intermediate focal length, "T" indicates the telephoto end, "f" indicates the focal length, "FNO" indicates the F-number, "ω" indicates a half-angle of view (unit: "°"), "Y" indicates the maximum image height, "TL" indicates the entire optical length (distance on the optical axis from a first surface of the lens plane to the image plane I), and "Bf" indicates the back focus.

In [Variable Distance Data], "dn" indicates a variable surface distance between an n-th surface (n is an integer) and an (n+1)-th surface, "Bf" indicates the back focus, "W" indicates the wide-angle end, "M" indicates the intermediate focal length, and "T" indicates the telephoto end. "d0" indicates the distance on the optical axis from the object surface to the first surface.

In [Lens Group Data], the starting surface and the focal length f of each lens group are shown.

In [Conditional Expression Correspondence Values], the correspondence values of each conditional expression of the variable magnification optical system according to the present Example are shown.

"mm" is generally used as the unit of the focal length f, the radius of curvature r, and other lengths shown in Table 1. However, the unit is not limited to this since an equivalent optical performance is obtained even when the optical system is proportionally expanded or proportionally reduced.

The same symbols as in Table 1 described above are used in Tables of other examples to be described later.

TABLE 1

| Surface Data | | | | |
|---|---|---|---|---|
| Surface number | r | d | nd | vd |
| Object plane | ∞ | | | |
| 1 | 51.1394 | 5.8000 | 1.487490 | 70.31 |
| 2 | 1133.2099 | 0.1000 | | |
| 3 | 82.0020 | 1.5000 | 1.672700 | 32.19 |
| 4 | 33.9780 | 6.2000 | 1.516800 | 63.88 |
| 5 | 133.9229 | Variable | | |
| 6 | −577.3429 | 1.0000 | 1.772500 | 49.62 |
| 7 | 21.5312 | 3.4000 | 1.846660 | 23.80 |
| 8 | 63.3609 | 3.4167 | | |
| 9 | −39.1089 | 1.0000 | 1.622990 | 58.12 |
| 10 | 126.2187 | Variable | | |
| 11 | 2276.1596 | 3.2242 | 1.603000 | 65.44 |
| 12 | −37.4736 | Variable | | |
| 13 | 23.6470 | 3.8000 | 1.487490 | 70.31 |
| 14 | 161.4472 | 0.1000 | | |
| 15 | 35.8671 | 4.4658 | 1.497820 | 82.57 |
| 16 | −50.2203 | 1.6000 | 1.902000 | 25.26 |
| 17 | 64.6451 | 5.3469 | | |
| 18(Aperture stop) | ∞ | 7.4591 | | |
| 19 | −157.1854 | 2.9000 | 1.850260 | 32.35 |
| 20 | −14.7113 | 0.9000 | 1.795000 | 45.31 |
| 21 | 35.0299 | 2.2000 | | |
| 22 | 29.4465 | 1.0000 | 1.806100 | 40.97 |
| 23 | 21.3319 | 3.3000 | 1.603420 | 38.03 |
| 24 | −48.3688 | 11.6956 | | |
| 25 | −16.7768 | 1.0000 | 1.744000 | 44.81 |
| 26 | −31.2907 | Bf | | |
| Image plane | ∞ | | | |

| Various Data | | | |
|---|---|---|---|
| | W | M | T |
| f | 56.60 | 135.00 | 194.00 |
| FNO | 4.11 | 5.27 | 5.82 |
| ω | 14.23 | 5.84 | 4.07 |
| Y | 14.00 | 14.00 | 14.00 |
| TL | 131.99 | 157.03 | 166.71 |
| Bf | 23.64 | 39.59 | 52.68 |

| Variable Distance Data | | | | | | |
|---|---|---|---|---|---|---|
| | Infinity focusing state | | | Close-distance focusing state (Imaging distance: 1.5 m) | | |
| | W | M | T | W | M | T |
| D0 | ∞ | ∞ | ∞ | 1368.01 | 1342.97 | 1333.288 |
| D5 | 2.595 | 24.025 | 28.556 | 2.595 | 24.025 | 28.5560 |
| D10 | 28.666 | 9.576 | 1.980 | 30.970 | 14.542 | 8.1859 |
| D12 | 5.674 | 12.431 | 12.086 | 3.371 | 7.464 | 5.8803 |
| Bf | 23.644 | 39.593 | 52.682 | 23.644 | 39.593 | 52.682 |

| Lens Group Data | | |
|---|---|---|
| Group | Starting surface | Focal length |
| 1 | 1 | 108.548 |
| 2 | 6 | −30.400 |
| 3 | 11 | 61.171 |
| 4 | 13 | 141.532 |

TABLE 1-continued

| Conditional Expression Correspondence Values | |
|---|---|
| (1) fp/(−fn) = | 4.656 |
| (2) fp/ff = | 2.314 |
| (3) f1/(−fn) = | 3.571 |
| (4) f1/fw = | 1.918 |
| (5) fp/fw = | 2.501 |
| (6) (−fn)/ft = | 0.157 |

Figure 3:
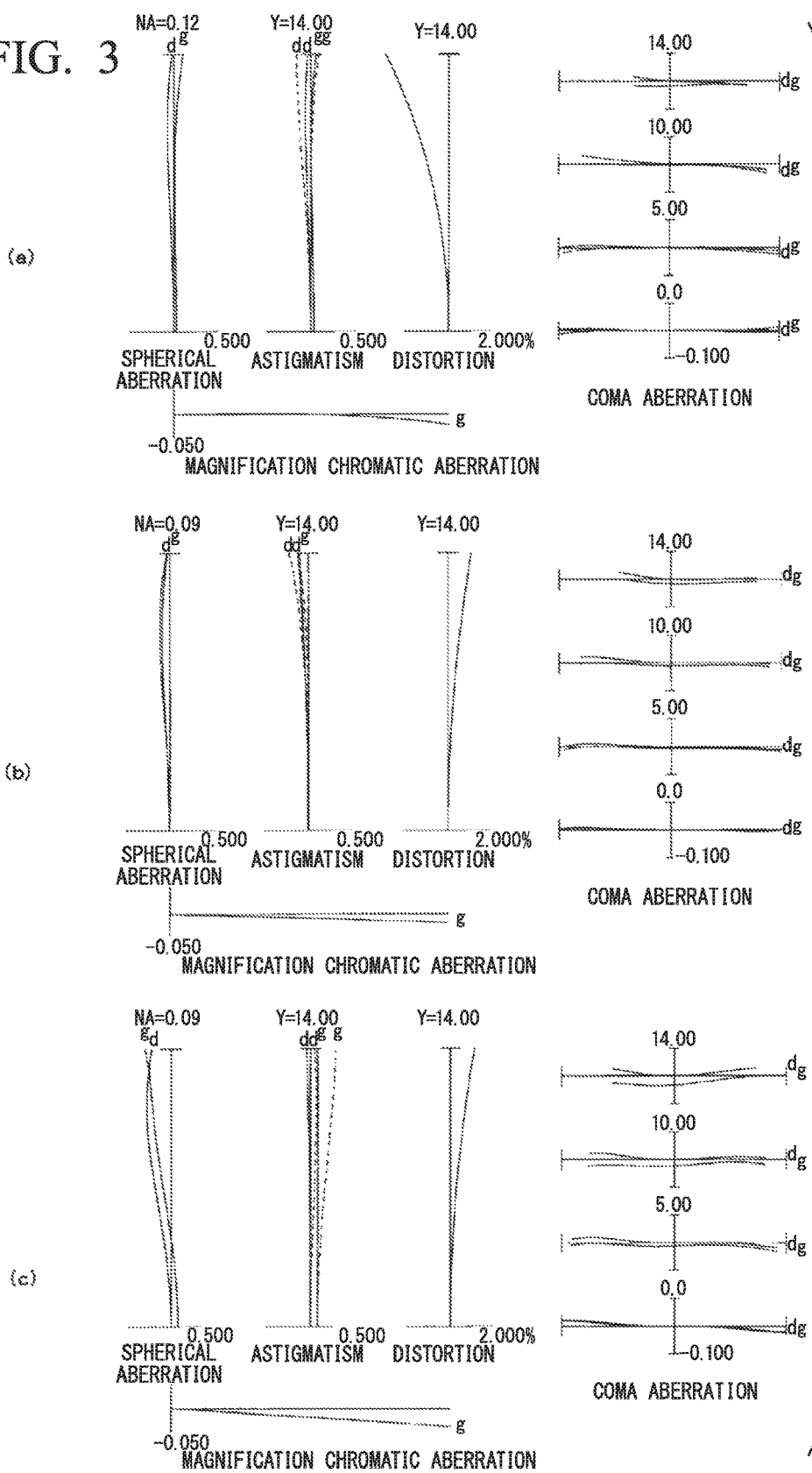
FIG. 3 shows graphs showing various aberrations of the variable magnification optical system according to Example 1 in a close-distance focusing state, wherein part (a) shows various aberrations in the wide-angle end state, part (b) shows various aberrations in the intermediate focal length state, and part (c) shows various aberrations in the telephoto end state.

FIG. 2 shows graphs showing various aberrations of the variable magnification optical system according to Example 1 in an infinity focusing state, wherein part (a) shows various aberrations in the wide-angle end state, part (b) shows various aberrations in the intermediate focal length state, and part (c) shows various aberrations in the telephoto end state. FIG. 3 shows graphs showing various aberrations of the variable magnification optical system according to Example 1 in a close-distance focusing state, wherein part (a) shows various aberrations in the wide-angle end state, part (b) shows various aberrations in the intermediate focal length state, and part (c) shows various aberrations in the telephoto end state.

In the graphs showing aberrations of FIG. 2 and FIG. 3, "FNO" indicates the F-number, "NA" indicates a numerical aperture, "Y" indicates an image height, "d" indicates the d-line (wavelength: λ=587.6 nm), and "g" indicates the g-line (wavelength: λ=435.8 nm). In the astigmatism graphs, a solid line indicates a sagittal image plane, and a broken line indicates a meridional image plane. The same reference symbols as in Example 1 are used in the aberration graphs of examples to be described later.

It can be clearly understood from the aberration graphs that the variable magnification optical system according to Example 1 satisfactorily corrects various aberrations throughout from the infinity focusing state to the close-distance focusing state in focal length states ranging from the wide-angle end state to the telephoto end state and has an excellent optical performance.

Example 2

Figure 4:
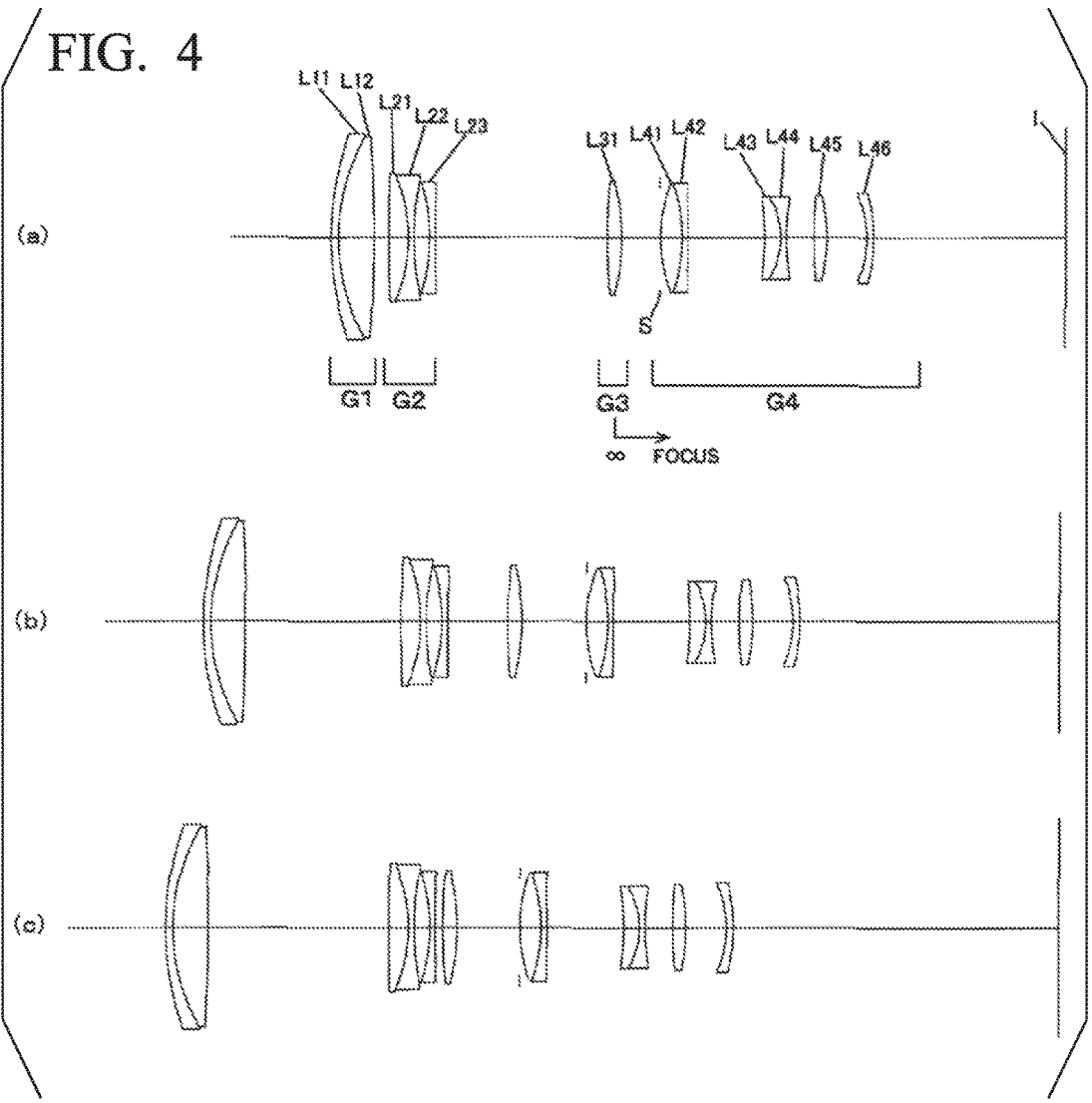
FIG. 4 is a cross-sectional view showing a lens configuration of a variable magnification optical system according to Example 2. Part (a) shows a wide-angle end state, part (b) shows an intermediate focal length state, and part (c) shows a telephoto end state.

FIG. 4 is a cross-sectional view showing a configuration of a variable magnification optical system according to Example 2. Part (a) shows a wide-angle end state, part (b) shows an intermediate focal length state, and part (c) shows a telephoto end state. The variable magnification optical system according to Example 2 is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

Varying magnification from the wide-angle end state to the telephoto end state is performed by moving each lens group from the first lens group G1 to the fourth lens group G4 such that the air distance between the first lens group G1 and the second lens group G2 is enlarged, the air distance between the second lens group G2 and the third lens group G3 is narrowed, and the air distance between the third lens group G3 and the fourth lens group G4 is enlarged. At this time, the first lens group G1, the third lens group G3, and the fourth lens group G4 are moved toward an object, and the second lens group G2 is moved once toward an image plane I and is then moved toward the object.

The first lens group G1 is constituted by a cemented lens including, in order from the object along the optical axis, a negative meniscus lens L11 having a convex surface oriented toward the object and a positive lens L12 having a biconvex shape.

The second lens group G2 is constituted by, in order from the object along the optical axis, a cemented lens that includes a positive lens L21 having a biconvex shape and a negative lens L22 having a biconcave shape, and a negative lens L23 having a biconcave shape.

The third lens group G3 is constituted by a positive lens L31 having a biconvex shape.

The fourth lens group G4 is constituted by, in order from the object along the optical axis, an aperture stop S, a cemented lens that includes a positive lens L41 having a biconvex shape and a negative meniscus lens L42 having a concave surface oriented toward the object, a cemented lens that includes a positive meniscus lens L43 having a concave surface oriented toward the object and a negative lens L44 having a biconcave shape, a positive lens L45 having a biconvex shape, and a negative meniscus lens L46 having a concave surface oriented toward the object.

Focusing from an object at infinity to an object at a close distance is performed by moving the third lens group G3 toward the image plane I.

Table 2 below shows values of specifications of the variable magnification optical system according to Example 2.

TABLE 2

| Surface Data | | | | |
|---|---|---|---|---|
| Surface number | r | d | nd | vd |
| Object plane | ∞ | | | |
| 1 | 63.095 | 1.500 | 1.80518 | 25.45 |
| 2 | 41.791 | 7.123 | 1.58913 | 61.22 |
| 3 | −386.418 | Variable | | |
| 4 | 479.014 | 3.954 | 1.80518 | 25.45 |
| 5 | −32.519 | 1.100 | 1.72916 | 54.61 |
| 6 | 59.138 | 3.181 | 1.00000 | |
| 7 | −37.896 | 1.100 | 1.80400 | 46.60 |
| 8 | 743.156 | Variable | | |
| 9 | 114.932 | 2.900 | 1.49782 | 82.57 |
| 10 | −47.146 | Variable | | |
| 11(Aperture stop) | ∞ | 0.100 | | |
| 12 | 32.029 | 4.395 | 1.60300 | 65.44 |
| 13 | −34.300 | 1.100 | 1.80518 | 25.45 |
| 14 | −459.609 | 15.385 | | |
| 15 | −63.416 | 3.199 | 1.85026 | 32.35 |
| 16 | −16.491 | 1.100 | 1.75500 | 52.34 |
| 17 | 44.329 | 5.586 | | |
| 18 | 92.872 | 2.697 | 1.71999 | 50.26 |
| 19 | −40.382 | 8.116 | | |
| 20 | −22.000 | 1.400 | 1.80100 | 34.92 |
| 21 | −35.076 | Bf | | |
| Image plane | ∞ | | | |

| Various Data | | | |
|---|---|---|---|
| | W | M | T |
| f | 56.60 | 135.00 | 194.00 |
| FNO | 4.12 | 5.03 | 5.86 |
| ω | 14.25 | 5.83 | 4.06 |
| Y | 14.00 | 14.00 | 14.00 |
| TL | 148.32 | 172.86 | 180.32 |
| Bf | 39.01 | 52.66 | 65.83 |

TABLE 2-continued

Variable Distance Data

| | Infinity focusing state | | | Close-distance focusing state (Imaging distance: 1.5 m) | | |
|---|---|---|---|---|---|---|
| | W | M | T | W | M | T |
| D0 | ∞ | ∞ | ∞ | 1351.67 | 1327.14 | 1319.67 |
| D3 | 3.000 | 31.280 | 36.518 | 3.000 | 31.280 | 36.518 |
| D8 | 34.644 | 12.104 | 1.500 | 36.933 | 18.430 | 9.778 |
| D10 | 7.717 | 12.876 | 12.530 | 5.427 | 6.550 | 4.252 |
| Bf | 39.019 | 52.657 | 65.834 | 39.019 | 52.657 | 65.834 |

Lens Group Data

| Group | Starting surface | Focal length |
|---|---|---|
| 1 | 1 | 109.858 |
| 2 | 4 | −32.251 |
| 3 | 9 | 67.558 |
| 4 | 11 | 127.122 |

Conditional Expression Correspondence Values

| | |
|---|---|
| (1) fp/(−fn) = | 3.942 |
| (2) fp/ff = | 1.882 |
| (3) f1/(−fn) = | 3.407 |
| (4) f1/fw = | 1.941 |
| (5) fp/fw = | 2.246 |
| (6) (−fn)/ft = | 0.166 |

Figure 5:
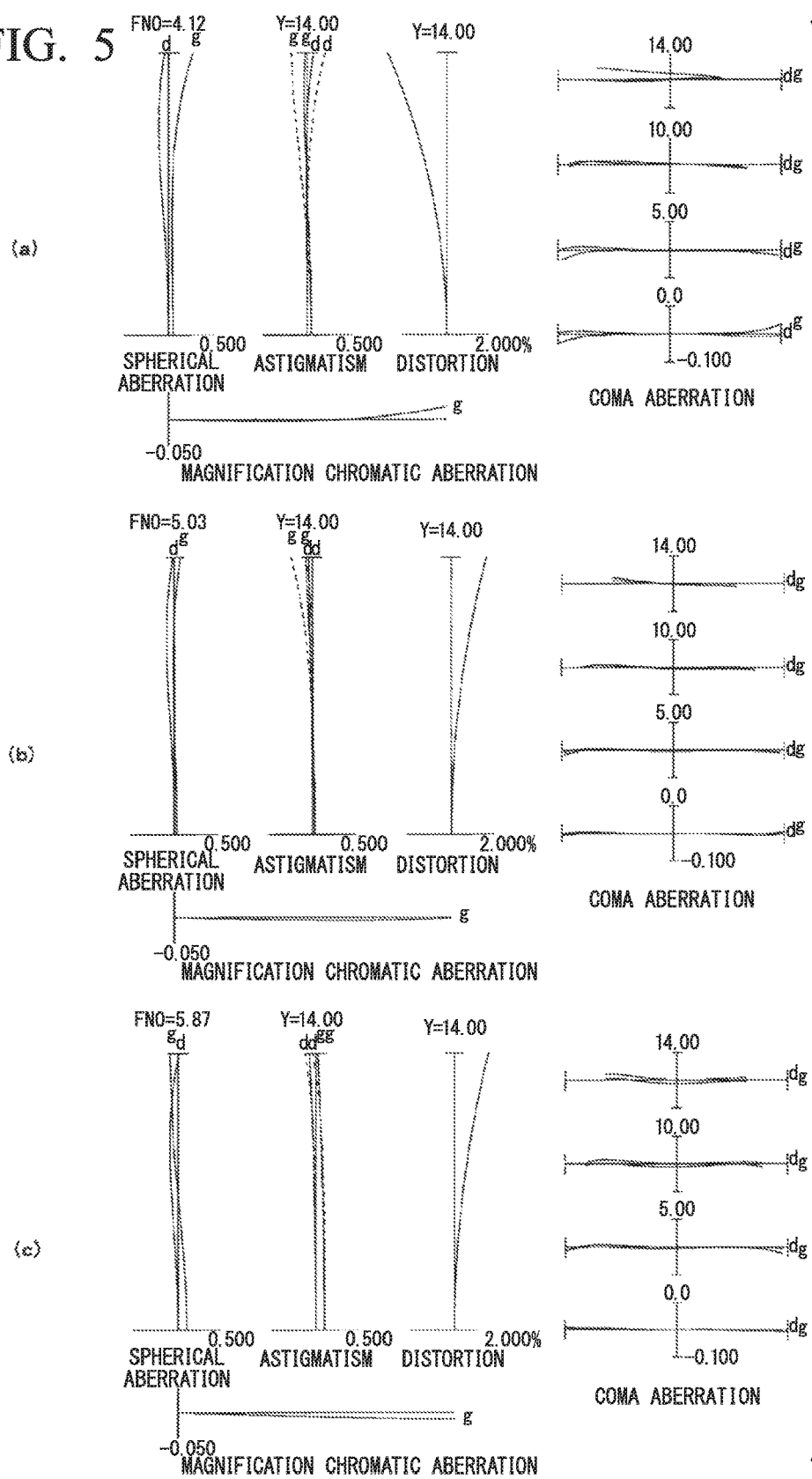
FIG. 5 shows graphs showing various aberrations of the variable magnification optical system according to Example 2 in an infinity focusing state, wherein part (a) shows various aberrations in the wide-angle end state, part (b) shows various aberrations in the intermediate focal length state, and part (c) shows various aberrations in the telephoto end state.
Figure 6:
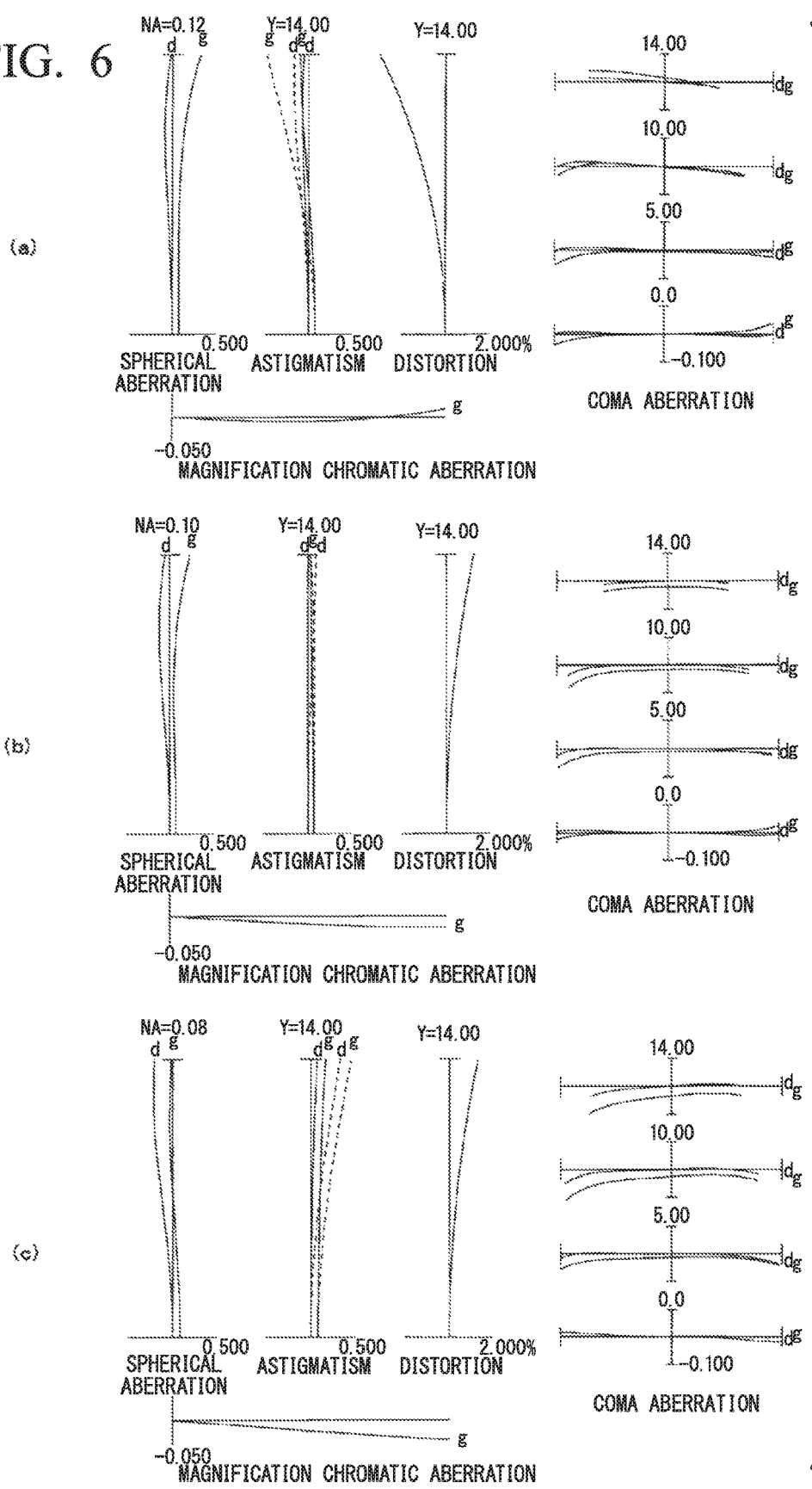
FIG. 6 shows graphs showing various aberrations of the variable magnification optical system according to Example 2 in a close-distance focusing state, wherein part (a) shows various aberrations in the wide-angle end state, part (b) shows various aberrations in the intermediate focal length state, and part (c) shows various aberrations in the telephoto end state.

FIG. 5 shows graphs showing various aberrations of the variable magnification optical system according to Example 2 in an infinity focusing state, wherein part (a) shows various aberrations in the wide-angle end state, part (b) shows various aberrations in the intermediate focal length state, and part (c) shows various aberrations in the telephoto end state. FIG. 6 shows graphs showing various aberrations of the variable magnification optical system according to Example 2 in a close-distance focusing state, wherein part (a) shows various aberrations in the wide-angle end state, part (b) shows various aberrations in the intermediate focal length state, and part (c) shows various aberrations in the telephoto end state.

It can be clearly understood from the aberration graphs that the variable magnification optical system according to Example 2 satisfactorily corrects various aberrations throughout from the infinity focusing state to the close-distance focusing state in focal length states ranging from the wide-angle end state to the telephoto end state and has an excellent optical performance.

Example 3

Figure 7:
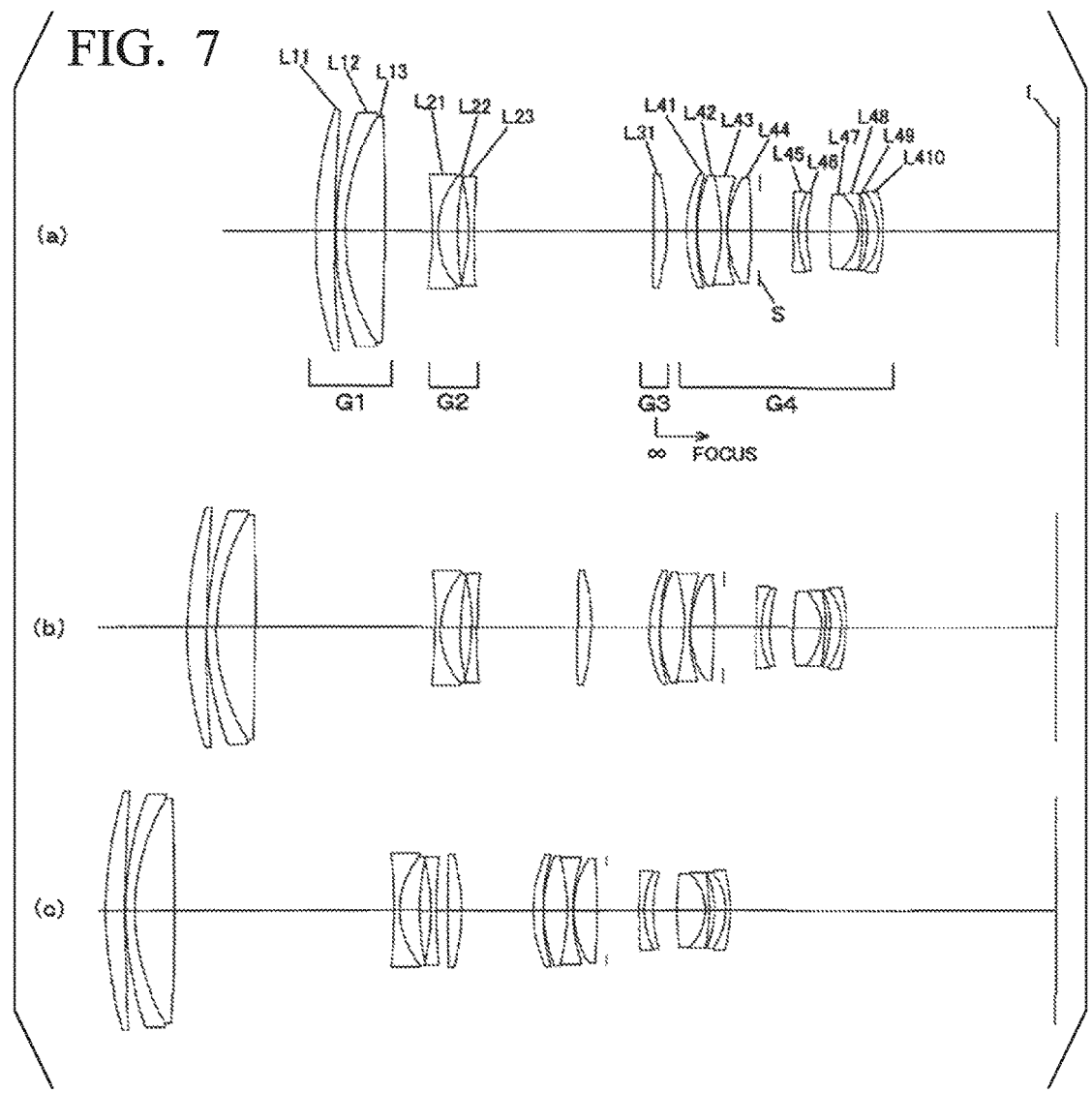
FIG. 7 is a cross-sectional view showing a lens configuration of a variable magnification optical system according to Example 3. Part (a) shows a wide-angle end state, part (b) shows an intermediate focal length state, and part (c) shows a telephoto end state.

FIG. 7 is a cross-sectional view showing a configuration of a variable magnification optical system according to Example 3. Part (a) shows a wide-angle end state, part (b) shows an intermediate focal length state, and part (c) shows a telephoto end state. The variable magnification optical system according to Example 3 is constituted by, in order from an object along an optical axis, a first lens group G1 having a positive refractive power; a second lens group G2 having a negative refractive power; a third lens group G3 having a positive refractive power; and a fourth lens group G4 having a positive refractive power.

Varying magnification from the wide-angle end state to the telephoto end state is performed by moving each lens group from the first lens group G1 to the fourth lens group G4 such that the air distance between the first lens group G1 and the second lens group G2 is enlarged, the air distance between the second lens group G2 and the third lens group G3 is narrowed, and the air distance between the third lens group G3 and the fourth lens group G4 is enlarged. At this time, the first lens group G1, the third lens group G3, and the fourth lens group G4 are moved toward an object, and the second lens group G2 is moved once toward an image plane I and is then moved toward the object.

The first lens group G1 is constituted by a cemented lens including, in order from the object along the optical axis, a positive meniscus lens L11 having a convex surface oriented toward the object, a negative meniscus lens L12 having a convex surface oriented toward the object, and a positive lens L13 having a biconvex shape.

The second lens group G2 is constituted by, in order from the object along the optical axis, a cemented lens that includes a negative lens L21 having a biconcave shape and a positive meniscus lens L22 having a convex surface oriented toward the object and a negative lens L23 having a biconcave shape.

The third lens group G3 is constituted by a positive lens L31 having a biconvex shape.

The fourth lens group G4 is constituted by, in order from the object along the optical axis, a positive meniscus lens L41 having a convex surface oriented toward the object, a cemented lens that includes a positive lens L42 having a biconvex shape and a negative lens L43 having a biconcave shape, a positive lens L44 having a biconvex shape, an aperture stop S, a cemented lens that includes a negative meniscus lens L45 having a convex surface oriented toward the object and a positive meniscus lens L46 having a convex surface oriented toward the object, a cemented lens that includes a positive lens L47 having a biconvex shape and a negative meniscus lens L48 having a concave surface oriented toward the object, and a cemented lens that includes a positive meniscus lens L49 having a concave surface oriented toward the object and a negative meniscus lens L410 having a convex surface oriented toward the image plane I.

Focusing from an object at infinity to an object at a close distance is performed by moving the third lens group G3 toward the image plane I.

Table 3 below shows values of specifications of the variable magnification optical system according to Example 3.

TABLE 3

Surface Data

| Surface number | r | d | nd | vd |
|---|---|---|---|---|
| Object plane | ∞ | | | |
| 1 | 89.300 | 4.180 | 1.51680 | 63.88 |
| 2 | 316.082 | 0.200 | | |
| 3 | 74.492 | 2.000 | 1.78472 | 25.64 |
| 4 | 48.539 | 8.579 | 1.49782 | 82.57 |
| 5 | −838.233 | Variable | | |
| 6 | −119.487 | 1.200 | 1.74100 | 52.77 |
| 7 | 19.035 | 4.234 | 1.84666 | 23.80 |
| 8 | 54.757 | 2.458 | | |
| 9 | −49.574 | 1.200 | 1.80400 | 46.60 |
| 10 | 168.034 | Variable | | |
| 11 | 828.136 | 2.917 | 1.69680 | 55.52 |
| 12 | −48.879 | Variable | | |
| 13 | 30.703 | 2.123 | 1.69680 | 55.52 |
| 14 | 44.923 | 0.200 | | |
| 15 | 32.528 | 5.119 | 1.49700 | 81.54 |
| 16 | −48.114 | 1.200 | 1.90366 | 31.31 |
| 17 | 37.289 | 0.200 | | |
| 18 | 22.379 | 5.054 | 1.56384 | 60.71 |
| 19 | −159.569 | 2.000 | | |

TABLE 3-continued

| 20(Aperture stop) | ∞ | 7.000 | | |
|---|---|---|---|---|
| 21 | 278.397 | 1.100 | 1.77250 | 49.62 |
| 22 | 20.692 | 1.881 | 2.00069 | 25.46 |
| 23 | 28.919 | 5.059 | | |
| 24 | 53.389 | 6.194 | 1.64769 | 33.73 |
| 25 | −11.591 | 0.793 | 1.71999 | 50.27 |
| 26 | −50.239 | 1.152 | | |
| 27 | −22.754 | 2.381 | 1.48749 | 70.31 |
| 28 | −15.003 | 1.000 | 1.80100 | 34.92 |
| 29 | −36.400 | Bf | | |
| Image plane | ∞ | | | |

Various Data

| | W | M | T |
|---|---|---|---|
| f | 56.60 | 135.00 | 294.00 |
| FNO | 4.07 | 4.62 | 5.85 |
| ω | 15.26 | 6.11 | 2.82 |
| Y | 14.00 | 14.00 | 14.00 |
| TL | 164.20 | 191.81 | 209.50 |
| Bf | 38.19 | 45.74 | 70.76 |

Variable Distance Data

| | Infinity focusing state | | | Close-distance focusing state (Imaging distance: 1.5 m) | | |
|---|---|---|---|---|---|---|
| | W | M | T | W | M | T |
| D0 | ∞ | ∞ | ∞ | 1335.80 | 1308.19 | 1290.50 |
| D5 | 10.131 | 38.736 | 47.693 | 10.131 | 38.736 | 47.693 |
| D10 | 38.763 | 21.929 | 2.500 | 40.495 | 27.931 | 13.796 |
| D12 | 4.193 | 12.481 | 15.615 | 2.461 | 6.479 | 4.319 |
| Bf | 38.185 | 45.741 | 70.765 | 38.185 | 45.741 | 70.765 |

Lens Group Data

| Group | Starting surface | Focal length |
|---|---|---|
| 1 | 1 | 106.784 |
| 2 | 6 | −26.150 |
| 3 | 11 | 66.329 |
| 4 | 13 | 140.408 |

Conditional Expression Correspondence Values

| (1) fp/(−fn) = | 5.369 |
|---|---|
| (2) fp/ff = | 2.117 |
| (3) f1/(−fn) = | 4.086 |
| (4) f1/fw = | 1.907 |
| (5) fp/fw = | 2.507 |

Figure 8:
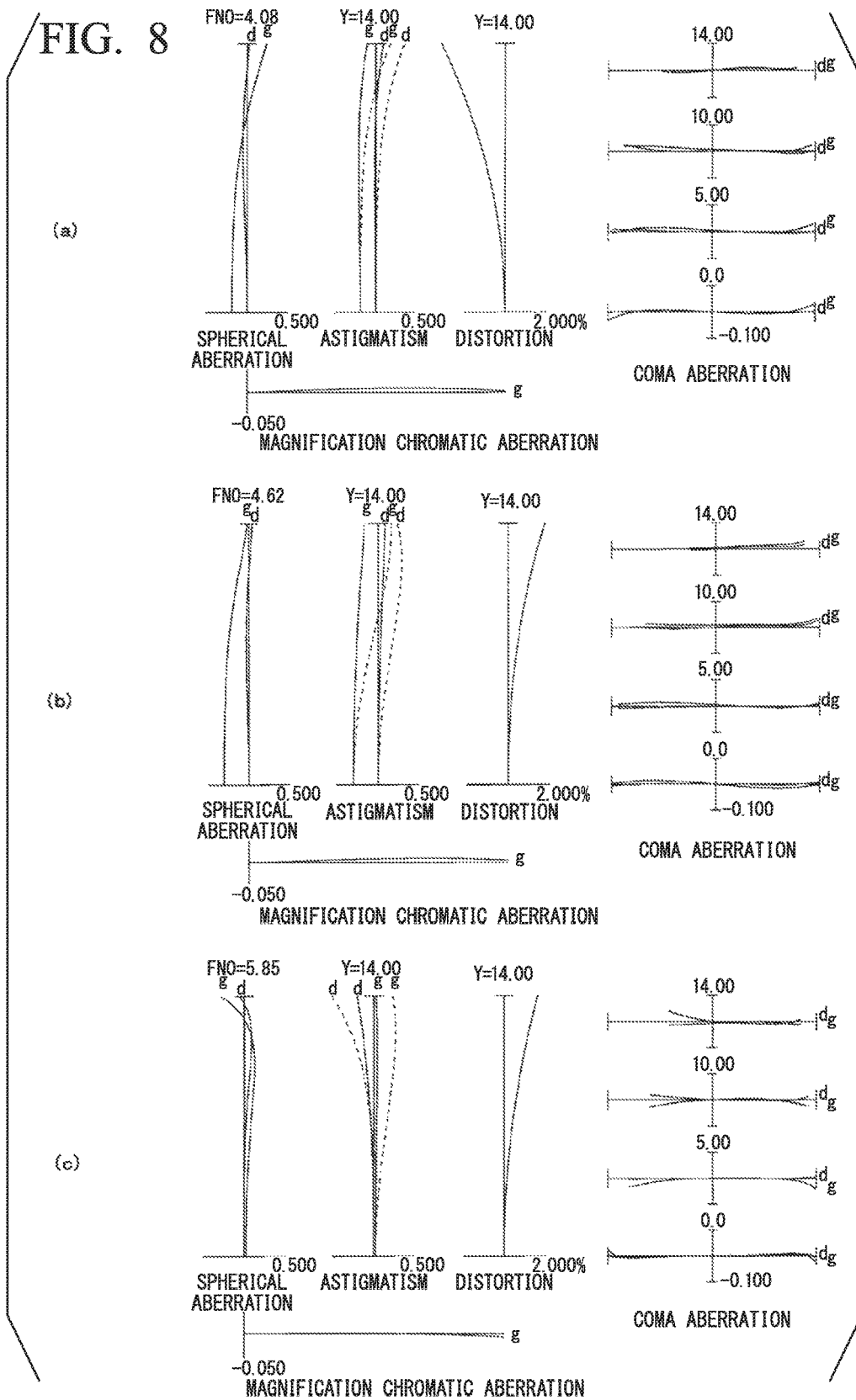
FIG. 8 shows graphs showing various aberrations of the variable magnification optical system according to Example 3 in an infinity focusing state, wherein part (a) shows various aberrations in the wide-angle end state, part (b) shows various aberrations in the intermediate focal length state, and part (c) shows various aberrations in the telephoto end state.
Figure 9:
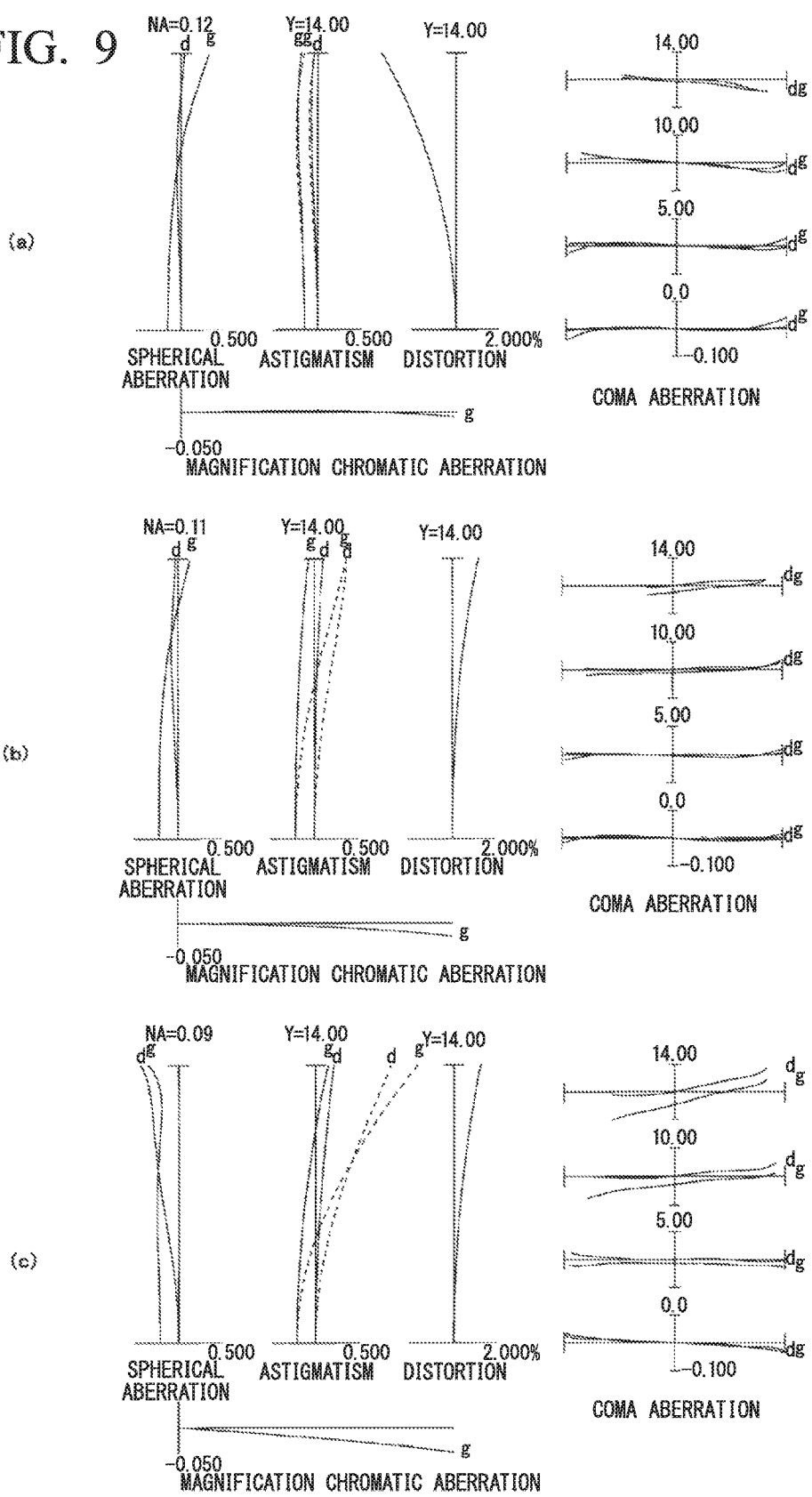
FIG. 9 shows graphs showing various aberrations of the variable magnification optical system according to Example 3 in a close-distance focusing state, wherein part (a) shows various aberrations in the wide-angle end state, part (b) shows various aberrations in the intermediate focal length state, and part (c) shows various aberrations in the telephoto end state.

FIG. 8 shows graphs showing various aberrations of the variable magnification optical system according to Example 3 in an infinity focusing state, wherein part (a) shows various aberrations in the wide-angle end state, part (b) shows various aberrations in the intermediate focal length state, and part (c) shows various aberrations in the telephoto end state. FIG. 9 shows graphs showing various aberrations of the variable magnification optical system according to Example 3 in a close-distance focusing state, wherein part (a) shows various aberrations in the wide-angle end state, part (b) shows various aberrations in the intermediate focal length state, and part (c) shows various aberrations in the telephoto end state.

It can be clearly understood from the aberration graphs that the variable magnification optical system according to Example 3 satisfactorily corrects various aberrations throughout from the infinity focusing state to the close-distance focusing state in focal length states ranging from the wide-angle end state to the telephoto end state and has an excellent optical performance.

The above examples show specific examples of the present invention, but the present invention is not limited thereto. The following content can be appropriately employed within a range where the optical performance of the variable magnification optical system is not diminished.

Although the numerical examples of a four-group configuration have been shown as numerical examples of the variable magnification optical system, the present invention is not limited thereto, and a configuration of a variable magnification optical system having another group configuration (for example, a five-group configuration, a six-group configuration, and the like) can be employed. Specifically, a configuration in which a lens or a lens group is added at a position closest to an object or at a position closest to an image plane of the variable magnification optical system may be employed. A lens group refers to a portion having at least one lens isolated by air space which changes when varying magnification.

In the variable magnification optical system, part of a lens group, an entire lens group, or a plurality of lens groups may be moved in the optical axis direction as a focusing lens group in order to perform focusing from an object point at infinity to an object point at a close distance. For example, the entire first lens group may be the focusing group. Alternatively, in a configuration in which the first lens group is divided into two or more partial lens groups, the second or more partial lens group from the object may be the focusing group. Specifically, as described above, it can be preferable that the third lens group constituted by a single lens move on the optical axis toward the image plane. The focusing group described above can be applied to autofocus and is also suitable for driving based on an autofocus motor such as an ultrasonic motor, a stepping motor, and VCM. Although a satisfactory optical performance can be obtained by a configuration in which the focusing group is constituted by a cemented lens, it is possible to further downsize the variable magnification optical system by a configuration in which the focusing group is constituted by a single lens as described above.

In the variable magnification optical system, a configuration can be adopted in which an entire arbitrary lens group or part of the lens group is moved as a vibration-reduction lens group so as to include a component in a direction orthogonal with respect to the optical axis or is rotated (oscillated) in an in-plane direction including the optical axis to thereby correct image blur occurring due to camera shake or the like. Particularly, it can be preferable to use at least part of the fourth lens group as the vibration-reduction lens group. Specifically, in Example 1, it can be preferable to use the cemented lens that includes the positive meniscus lens L44 and the negative lens L45 as the vibration-reduction lens group. In Example 2, it can be preferable to use the cemented lens that includes the positive meniscus lens L43 and the negative lens L44 as the vibration-reduction lens group. In Example 3, it can be preferable to use the cemented lens that includes the negative meniscus lens L45 and the positive meniscus lens L46 as the vibration-reduction lens group.

The lens surface of a lens that constitutes the variable magnification optical system may be a spherical surface or a flat surface or may be an aspherical surface. When the lens surface is a spherical surface or a flat surface, it is possible to facilitate lens processing, assembly, and adjustment and to prevent degradation of optical performance due to errors in the lens processing, assembly and adjustment. Moreover, degradation of rendering performance is slight even when the image plane is shifted. When the lens surface is an aspherical surface, the aspherical surface may be any of an aspherical surface obtained by grinding, a glass-molded aspherical surface obtained by molding glass into an aspherical shape, and a composite aspherical surface obtained by forming a resin provided on a glass surface into an aspherical shape. Moreover, the lens surface may be a diffraction surface. The lens may be a refractive index distributed lens (a GRIN lens) or a plastic lens.

It can be preferable that the aperture stop S be in the fourth lens group or in the vicinity of the fourth lens group. However, the role of the aperture stop may be substituted by a lens frame without providing a member as the aperture stop.

An anti-reflection film having high transmittance in a wide wavelength range may be applied to a lens surface of a lens that constitutes the variable magnification optical system. Thereby, flare and ghosting are reduced, and it is possible to achieve high optical performance with a high contrast.

In the variable magnification optical system, a half-angle of view cot in a telephoto end state can be preferably 1.5° to 4.5°, and a half-angle of view cow in a wide-angle end state can be preferably 11.0° to 24.0°.

Figure 10:
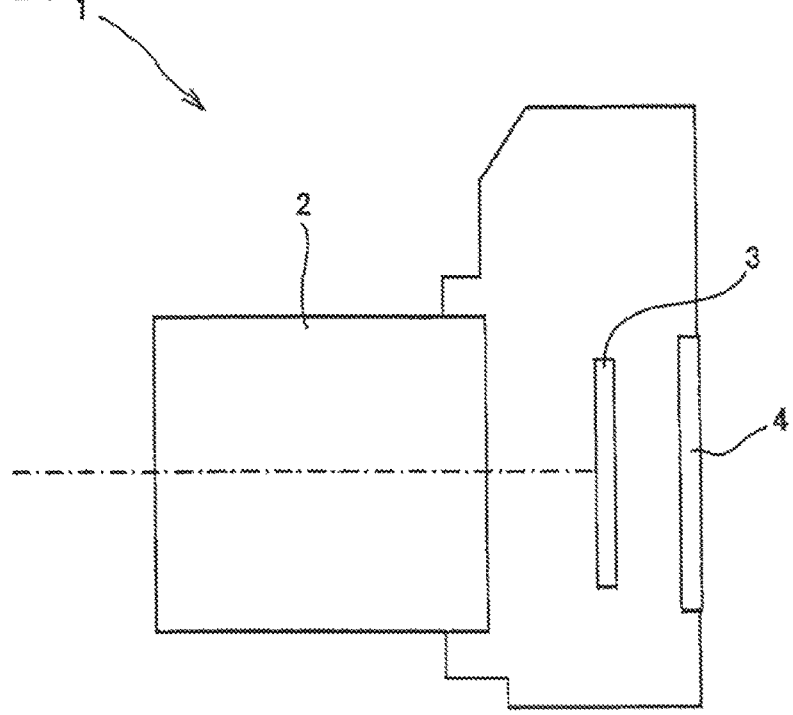
FIG. 10 is a diagram showing a configuration of an example of a camera in which a variable magnification optical system is mounted.

Next, an example of a camera including a variable magnification optical system is described with reference to FIG. 10. FIG. 10 is a diagram showing a configuration of an example of a camera including a variable magnification optical system. As shown in FIG. 10, a camera 1 is a so-called mirrorless camera with interchangeable lenses that includes the variable magnification optical system according to Example 1 described above as an image-capturing lens 2.

In the camera 1, light from an object (a subject) which is not shown is collected by the image-capturing lens 2 and forms a subject image on an image plane of an imaging unit 3 via an optical low-pass filter (OLPF) which is not shown. The subject image is photoelectrically converted by a photoelectric conversion element provided on the imaging unit 3, and the image of the subject is generated. This image is displayed on an electronic viewfinder (EVF) 4 provided on the camera 1. Thereby, a photographer can observe the subject via the EVF 4. When a release button (not shown) is pressed by the photographer, the image of the subject generated by the imaging unit 3 is stored in a memory (not shown). In this way, the photographer can capture the image of the subject using the camera 1.

The variable magnification optical system according to Example 1 described above that is mounted on the camera 1 as the image-capturing lens 2 is a variable magnification optical system that prevents aberration variation when varying magnification and that ensures a satisfactory optical performance. Accordingly, the camera 1 can realize a satisfactory optical performance in which aberration variation when varying magnification is prevented. A camera on which the variable magnification optical system according to Example 2 and Example 3 described above is mounted as the image-capturing lens 2 can also provide effects similar to the camera 1 described above. Further, even when the variable magnification optical system according to the above-described examples is mounted on a single-lens reflex camera which has a quick return mirror and by which a subject is observed using a finder optical system, it is possible to obtain effects similar to the camera 1 described above.

Hereinafter, an overview of an example of a variable magnification optical system manufacturing method is described with reference to FIG. 11.

Figure 11:
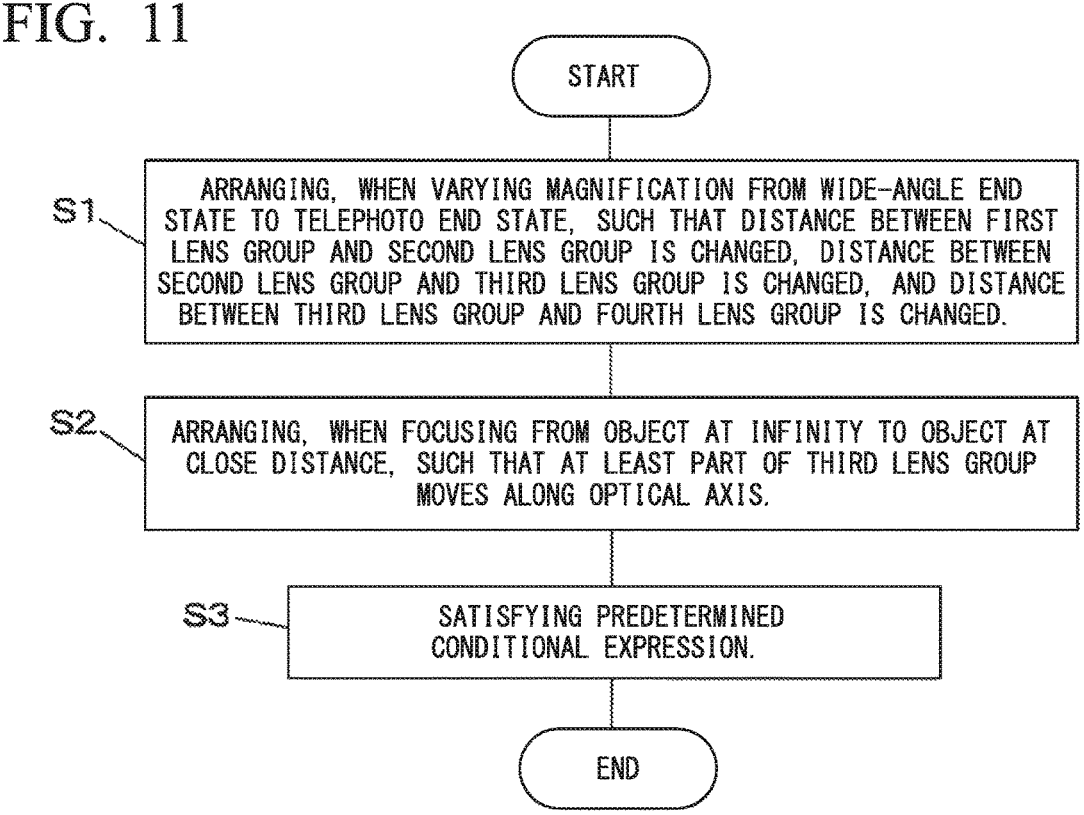
FIG. 11 is a flowchart describing an example of a variable magnification optical system manufacturing method.

In an example shown in FIG. 11, a variable magnification optical system manufacturing method is a manufacturing method of a variable magnification optical system including: a first lens group having a positive refractive power and arranged closest to an object; a negative lens group (second lens group) having a negative refractive power and arranged closer to an image than the first lens group; a positive lens group (fourth lens group) which has a positive refractive power, which includes at least one lens that moves integrally with an aperture stop, and which is arranged closer to the image than the negative lens group (second lens group); and a focusing group (at least part of the third lens group) arranged between the negative lens group (second lens group) and the positive lens group (fourth lens group), and the method includes the following steps S1 to S3.

That is, as step S1, an arrangement is made when varying magnification such that the distance between the first lens group and the negative lens group (second lens group) is changed, and the distance between the negative lens group (second lens group) and the positive lens group (fourth lens group) is changed. As step S2, an arrangement is made when focusing such that the distance between the focusing group (at least part of the third lens group) and a lens arranged at a position to face an object-side of the focusing group is changed, and the distance between the focusing group (at least part of the third lens group) and a lens arranged at a position to face an image-side of the focusing group is changed. As step S3, Conditional Expressions (1), (2) described below are satisfied.

$$2.00 < fp/(-fn) < 5.50 \tag{1}$$

$$1.83 < fp/ff < 4.75 \tag{2}$$

where fp: a focal length of the positive lens group,
fn: a focal length of the negative lens group, and
ff: a focal length of the focusing group.

Alternatively, in an example shown in FIG. 11, a variable magnification optical system manufacturing method is a manufacturing method of a variable magnification optical system including: in order from an object, a first lens group having a positive refractive power; a second lens group having a negative refractive power; a third lens group having a positive refractive power; and a fourth lens group having a positive refractive power, and the method includes the following steps S1 to S3.

That is, as step S1, an arrangement is made when varying magnification such that the distance between the first lens group and the second lens group is changed, the distance between the second lens group and the third lens group is changed, and the distance between the third lens group and the fourth lens group is changed. As step S2, an arrangement is made when focusing such that at least part of the third lens group as the focusing group moves along the optical axis. As step S3, Conditional Expressions (1), (2) described below are satisfied.

$$2.00 < fp/(-fn) < 5.50 \tag{1}$$

$$1.83 < fp/ff < 4.75 \tag{2}$$

where fn: a focal length of the second lens group,
ff: a focal length of the third lens group, and
fp: a focal length of the fourth lens group.

According to the manufacturing method described above, it is possible to manufacture a variable magnification optical system that prevents aberration variation due to varying magnification and that has high optical performance.

EXPLANATION OF NUMERALS AND CHARACTERS

G1: first lens group
G2: second lens group (negative lens group)

G3: third lens group (focusing group)
G4: fourth lens group (positive lens group)
I: image plane
S: aperture stop
1: camera
2: image-capturing lens
3: imaging unit
4: EVF

The invention claimed is:
1. A variable magnification optical system, comprising:
a first lens group having a positive refractive power and arranged closest to an object;
a negative lens group having a negative refractive power and arranged closer to an image plane than the first lens group;
a positive lens group which has a positive refractive power, which includes at least one lens that moves integrally with an aperture stop, and which is arranged closer to the image plane than the negative lens group; and
a focusing group arranged between the negative lens group and the positive lens group,
wherein when varying magnification, a distance between the first lens group and the negative lens group is changed, and a distance between the negative lens group and the positive lens group is changed,
wherein when focusing, a distance between the focusing group and a lens facing an object-side of the focusing group is changed, and a distance between the focusing group and a lens facing an image-side of the focusing group is changed, and
wherein the following conditional expressions are satisfied:

$$2.00 < fp/(-fn) < 5.50$$

$$1.83 < fp/ff < 4.75$$

where
fp: a focal length of the positive lens group,
fn: a focal length of the negative lens group, and
ff: a focal length of the focusing group.
2. The variable magnification optical system according to claim 1,
wherein when varying magnification, the first lens group moves with respect to the image plane.
3. The variable magnification optical system according to claim 1,
wherein the following conditional expression is satisfied:

$$2.50 < f1/(-fn) < 5.00$$

where
f1: a focal length of the first lens group.
4. The variable magnification optical system according to claim 1,
wherein the following conditional expression is satisfied:

$$1.50 < f1/fw < 2.60$$

where
f1: a focal length of the first lens group, and
fw: a focal length of the variable magnification optical system in a wide-angle end state.
5. The variable magnification optical system according to claim 1,
wherein the following conditional expression is satisfied:

$$1.60 < fp/fw < 3.70$$

where
fw: a focal length of the variable magnification optical system in a wide-angle end state.
6. The variable magnification optical system according to claim 1,
wherein the following conditional expression is satisfied:

$$0.12 < (-fn)/ft < 0.35$$

where
ft: a focal length of the variable magnification optical system in a telephoto end state.
7. The variable magnification optical system according to claim 1,
wherein the focusing group is constituted by a single lens component.
8. The variable magnification optical system according to claim 1,
wherein the aperture stop is arranged closer to the image plane than the second lens group.
9. The variable magnification optical system according to claim 1,
wherein
when varying magnification from a wide-angle end state to a telephoto end state,
a distance between the first lens group and the second lens group is increased, and
a distance between the second lens group and the third lens group is decreased.
10. An optical apparatus, comprising
a variable magnification optical system according to claim 1.
11. A variable magnification optical system, comprising:
in order from an object along an optical axis, a first lens group having a positive refractive power; a second lens group having a negative refractive power; a third lens group having a positive refractive power; and a fourth lens group having a positive refractive power,
wherein when varying magnification, a distance between the first lens group and the second lens group is changed, a distance between the second lens group and the third lens group is changed, and a distance between the third lens group and the fourth lens group is changed,
wherein when focusing, at least part of the third lens group as a focusing group moves along the optical axis, and
wherein the following conditional expressions are satisfied:

$$2.00 < fp/(-fn) < 5.50$$

$$1.83 < fp/ff < 4.75$$

$$1.50 < f1/fw < 2.60$$

where
fn: a focal length of the second lens group,
ff: a focal length of the third lens group,
fp: a focal length of the fourth lens group,
f1: a focal length of the first lens group, and
fw: a focal length of the variable magnification optical system in a wide-angle end state.
12. The variable magnification optical system according to claim 11,
wherein when varying magnification, the first lens group moves with respect to an image plane.
13. The variable magnification optical system according to claim 11, wherein the following conditional expression is satisfied:

$$2.50 < f1/(-fn) < 5.00$$

where
f1: a focal length of the first lens group.

14. The variable magnification optical system according to claim 11,
wherein the following conditional expression is satisfied:

$$1.60 < fp/fw < 3.70$$

where
fw: a focal length of the variable magnification optical system in a wide-angle end state.

15. The variable magnification optical system according to claim 11,
wherein the following conditional expression is satisfied:

$$0.12 < (-fn)/ft < 0.35$$

where
ft: a focal length of the variable magnification optical system in a telephoto end state.

16. The variable magnification optical system according to claim 11,
wherein the focusing group is constituted by a single lens component.

17. An optical apparatus, comprising
a variable magnification optical system according to claim 11.

18. A method of manufacturing a variable magnification optical system, comprising:
arranging a first lens group having positive refractive power closest to an object;
arranging a negative lens group having a negative refractive power closer to an image plane than the first lens group;
arranging a positive lens group, which has positive refractive power and includes at least one lens that moves integrally with an aperture stop, closer to the image plane than the negative lens group; and
arranging a focusing group between the negative lens group and the positive lens group,
wherein the groups are arranged such that
when varying magnification, a distance between the first lens group and the negative lens group is changed, and a distance between the negative lens group and the positive lens group is changed, and
when focusing, a distance between the focusing group and a lens facing an object-side of the focusing group is changed, and a distance between the focusing group and a lens facing an image-side of the focusing group is changed, and
wherein the following conditional expressions are satisfied:

$$2.00 < fp/(-fn) < 5.50$$

$$1.83 < fp/ff < 4.75$$

where
fp: a focal length of the positive lens group,
fn: a focal length of the negative lens group, and
ff: a focal length of the focusing group.

19. A method of manufacturing a variable magnification optical system, comprising:
arranging, in order from an object along an optical axis, a first lens group having a positive refractive power, a second lens group having a negative refractive power, a third lens group having a positive refractive power, and a fourth lens group having a positive refractive power,
wherein the lens groups are arranged such that:
when varying magnification, a distance between the first lens group and the second lens group is changed, a distance between the second lens group and the third lens group is changed, and a distance between the third lens group and the fourth lens group is changed, and
when focusing, at least part of the third lens group as a focusing group moves along the optical axis, and
wherein the following conditional expressions are satisfied:

$$2.00 < fp/(-fn) < 5.50$$

$$1.83 < fp/ff < 4.75$$

$$1.50 < f1/fw < 2.60$$

where
fn: a focal length of the second lens group,
ff: a focal length of the third lens group,
fp: a focal length of the fourth lens group
f1: a focal length of the first lens group, and
fw: a focal length of the variable magnification optical system in a wide-angle end state.

* * * * *